(12) United States Patent
Pope et al.

(10) Patent No.: US 9,391,840 B2
(45) Date of Patent: Jul. 12, 2016

(54) AVOIDING DELAYED DATA

(71) Applicant: Solarflare Communications, Inc., Irvine, CA (US)

(72) Inventors: Steve L. Pope, Costa Mesa, CA (US); David J. Riddoch, Fenstanton (GB); Kieran Mansley, Girton (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 293 days.

(21) Appl. No.: 13/789,221

(22) Filed: Mar. 7, 2013

(65) Prior Publication Data

US 2013/0297774 A1 Nov. 7, 2013

Related U.S. Application Data

(60) Provisional application No. 61/641,575, filed on May 2, 2012.

(51) Int. Cl.
*G06F 15/173* (2006.01)
*H04L 12/24* (2006.01)
(Continued)

(52) U.S. Cl.
CPC ............ *H04L 41/083* (2013.01); *H04L 47/286* (2013.01); *H04L 47/32* (2013.01); *H04L 47/564* (2013.01)

(58) Field of Classification Search
CPC ..... H04L 41/083; H04L 47/32; H04L 47/286; H04L 47/564
USPC ........................... 709/224, 235; 370/235, 328
See application file for complete search history.

(56) References Cited

U.S. PATENT DOCUMENTS 5,272,599 A 12/1993 Koenen
5,325,532 A 6/1994 Crosswy et al.
(Continued)

FOREIGN PATENT DOCUMENTS

EP 620521 A2 10/1994
EP 1968322 A1 9/2008
(Continued)

OTHER PUBLICATIONS

A. Edwards, et al.; "User-Space Protocols Deliver High Performance to Applications on a Low-Cost Gb/s LAN," ACM Computer Communication Review, vol. 24, No. 4, pp. 14-23, Oct. 1994.
(Continued)

*Primary Examiner* — Wen-Tai Lin
(74) *Attorney, Agent, or Firm* — Haynes Beffel & Wolfeld LLP; Warren S. Wolfeld

(57) ABSTRACT

Roughly described, a network interface device receiving data packets from a computing device for transmission onto a network, the data packets having a certain characteristic, transmits the packet only if the sending queue has authority to send packets having that characteristic. The data packet characteristics can include transport protocol number, source and destination port numbers, source and destination IP addresses, for example. Authorizations can be programmed into the NIC by a kernel routine upon establishment of the transmit queue, based on the privilege level of the process for which the queue is being established. In this way, a user process can use an untrusted user-level protocol stack to initiate data transmission onto the network, while the NIC protects the remainder of the system or network from certain kinds of compromise.

20 Claims, 1 Drawing Sheet

(51) Int. Cl.
  *H04L 12/841*   (2013.01)
  *H04L 12/823*   (2013.01)
  *G06F 15/16*    (2006.01)
  *G06F 11/00*    (2006.01)
  *H04W 4/00*     (2009.01)
  *H04L 12/875*   (2013.01)

(56) References Cited

U.S. PATENT DOCUMENTS

| | | |
|---|---|---|
| 5,946,189 A | 8/1999 | Koenen et al. |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,886,141 B1 | 4/2005 | Kunz et al. |
| 6,904,534 B2 | 6/2005 | Koenen |
| 6,940,855 B2 * | 9/2005 | Okamura .................. 370/389 |
| 6,950,961 B2 | 9/2005 | Krause et al. |
| 6,978,331 B1 | 12/2005 | Kagan et al. |
| 7,028,094 B2 * | 4/2006 | Le .................... H04L 1/1858 |
| | | 709/230 |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,447,782 B2 * | 11/2008 | Tahan .................... 709/229 |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,636,703 B2 | 12/2009 | Taylor |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,702,629 B2 | 4/2010 | Cytron et al. |
| 7,733,785 B2 * | 6/2010 | Andreev et al. .......... 370/238 |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,945,528 B2 | 5/2011 | Cytron et al. |
| 7,954,114 B2 | 5/2011 | Chamberlain et al. |
| 7,978,606 B2 | 7/2011 | Buskirk et al. |
| 8,000,336 B2 | 8/2011 | Harel |
| 8,156,101 B2 | 4/2012 | Indeck et al. |
| 8,326,816 B2 | 12/2012 | Colle et al. |
| 8,576,716 B2 * | 11/2013 | Li ....................... H04L 47/10 |
| | | 370/235 |
| 8,626,934 B2 * | 1/2014 | Jakobsson et al. ......... 709/229 |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0033588 A1 | 2/2003 | Alexander |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0086300 A1 | 5/2003 | Noyes et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2003/0235202 A1 | 12/2003 | Van Der Zee et al. |
| 2004/0015502 A1 | 1/2004 | Alexander et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045096 A1 | 3/2006 | Farmer et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0060197 A1 | 3/2009 | Taylor et al. |
| 2009/0103478 A1 * | 4/2009 | Sammour et al. .......... 370/328 |

(56) References Cited

U.S. PATENT DOCUMENTS

| | | | |
|---|---|---|---|
| 2009/0165003 A1 | 6/2009 | Jacobson et al. | |
| 2009/0182683 A1 | 7/2009 | Taylor et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0287628 A1 | 11/2009 | Indeck et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0198850 A1 | 8/2010 | Cytron et al. | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0040701 A1 | 2/2011 | Singla et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |
| 2011/0178917 A1 | 7/2011 | Parsons et al. | |
| 2011/0178918 A1 | 7/2011 | Parsons et al. | |
| 2011/0178919 A1 | 7/2011 | Parsons et al. | |
| 2011/0178957 A1 | 7/2011 | Parsons et al. | |
| 2011/0184844 A1 | 7/2011 | Parsons et al. | |
| 2011/0286468 A1* | 11/2011 | Tomonaga et al. | 370/412 |
| 2012/0089496 A1 | 4/2012 | Taylor et al. | |
| 2012/0089497 A1 | 4/2012 | Taylor et al. | |
| 2012/0095893 A1 | 4/2012 | Taylor et al. | |
| 2012/0246052 A1 | 9/2012 | Taylor et al. | |
| 2013/0000700 A1 | 1/2013 | Lee | |

FOREIGN PATENT DOCUMENTS

| | | | |
|---|---|---|---|
| EP | 2001231 | A2 | 12/2008 |
| WO | 0148972 | A1 | 7/2001 |
| WO | 0235838 | A1 | 5/2002 |
| WO | 2008016848 | A2 | 2/2008 |
| WO | 2008127672 | A2 | 10/2008 |
| WO | 2009134219 | A1 | 11/2009 |
| WO | 2009136933 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

A. Edwards, S. Muir; "Experiences Implementing a High-Performance TCP in User-Space," ACM Computer Communication Review, vol. 25, No. 4, pp. 196-205, Oct. 1995.
A. Romanow and S. Floyd; "The Dynamics of TCP Traffic over ATM Networks," ACM Computer Communication Review, vol. 24, No. 4, pp. 79-88, Oct. 1994.
Andrew D. Birrell, et al.; "Grapevine: An Exercise in Distributed Computing," Communications of the ACM, vol. 25, Issue 4, pp. 260-274, Apr. 1982.
Andy Currid; "TCP Offload to the Rescue," ACM Queue, vol. 2, No. 3, pp. 58-65, May 1, 2004.
B. Leslie, et al.; "User-level device drivers: Achieved performance," J. Comput. Sci. & Technol., vol. 20, pp. 1-17, Sep. 2005.
Babak Falsafi, et al.; "Application-Specific Protocols for User-Level Shared Memory," Proceedings of the 1994 conference on Supercomputing, pp. 380-389, Washington D.C.; Nov. 14, 1994.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
Bruce Lowekamp, et al.; "Topology Discovery for Large Ethernet Networks," ACM Computer Communication Review, vol. 31, No. 4, pp. 237-248, Oct. 2001.
Bruce S. Davie; "A Host-Network Interface Architecture for ATM," ACM Computer Communication Review, vol. 21, No. 4, pp. 307-315, Sep. 1991.
C. A. Thekkath, et al.; "Implementing Network Protocols at User Level," ACM Computer Communication Review, vol. 23, No. 4, pp. 64-132, Oct. 1993.
C. Brendan S. Traw, et al.; "A High-Performance Host Interface for ATM Networks," ACM Computer Communication Review, vol. 21, No. 4, pp. 317-325, Sep. 1991.
C. Kline; "Supercomputers on the Internet: A Case Study," ACM Computer Communication Review, vol. 17, No. 5, pp. 27-33, Aug. 1987.
C. Partridge, J. Hughes, J. Stone; "Performance of Checksums and CRCS over Real Data," ACM Computer Communication Review, vol. 25, No. 4, pp. 68-76, Oct. 1995.
C. Traw and J. Smith; "Hardware/Software organization of a high performance ATM host interface," IEEE Journal on Selected Areas in Communications, pp. 1-22, Feb. 1993.
Charles Kalmanek; "A Retrospective View of ATM," ACM Computer Communication Review, vol. 32, No. 5, pp. 13-19, Nov. 2002.
Charles P. Thacker and Lawrence C. Stewart; "Firefly: a Multiprocessor Workstation," ACM Operating Systems Review, vol. 21, Issue 4, pp. 164-172, Oct. 1987.
Cheng Jin, et al.; "Fast TCP: Motivation, Architecture, Algorithms, Performance," Proceedings of IEEE Infocom 2004, 21 pages, Mar. 7, 2004.
Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.
Chris Maeda, Brian Bershad; "Protocol Service Decomposition for High-Performance Networking," ACM Operating Systems Review, vol. 27, Issue 5, 12 pages, Dec. 1993.
Christopher A. Kent, Jeffrey C. Mogul; "Fragmentation Considered Harmful," ACM Computer Communication Review, vol. 17, No. 5, pp. 75-87, Oct. 1987.
Craig Partridge; "How Slow Is One Gigabit Per Second ?," ACM Computer Communication Review, vol. 20, No. 1, pp. 44-53, Jan. 1990.
D. D. Clark and D. L. Tennenhouse; "Architectural Considerations for a New Generation of Protocols," ACM Computer Communication Review, vol. 20, No. 4, pp. 200-208, Sep. 1990.
D. L. Tennenhouse, D. J. Wetherall; "Towards an Active Network Architecture," ACM Computer Communication Review, vol. 26, No. 2, pp. 5-18, Apr. 1996.
Danny Cohen, et al.; "Use of message-based multicomputer components to construct gigabit networks," ACM Computer Communication Review, vol. 23, No. 4, p. 32-44, Jul. 1993.
Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
David A. Borman; "Implementing TCP/IP on a Cray computer," ACM Computer Communication Review, vol. 19, No. 2, pp. 11-15, Apr. 1989.
David D. Clark; "The Design Philosophy of the DARPA Internet Protocols," ACM Computer Communication Review, vol. 18, No. 4, pp. 102-111, Aug. 1988.

(56) References Cited

OTHER PUBLICATIONS

David D. Clark, et al.; "An Analysis of TCP Processing Overhead," IEEE Communications Magazine, vol. 27, No. 6, pp. 23-29, Jun. 1989.

David R. Boggs, et al.; "Measured Capacity of an Ethernet: Myths and Reality," ACM Computer Communication Review, vol. 18, No. 4, pp. 222-234, Aug. 1988.

David R. Cheriton; "Sirpent: A High-Performance Internetworking Approach," ACM Computer Communication Review, vol. 19, No. 4, pp. 158-169, Sep. 1989.

David Wetherell; "10 Networking Papers: Readings for Protocol Design," ACM Computer Communication Review, vol. 36, No. 3, pp. 77-78, Jul. 2006.

Derek McAuley, Rolf Neugebauer; "A case for Virtual Channel Processors," Proceedings of the ACM SIGCOMM 2003 Workshops, pp. 237-242, Aug. 2003.

Derek Robert McAuley; "Protocol Design for High Speed Networks," PhD Thesis, University of Cambridge, 104 pages, Sep. 1989.

E. Blanton and M. Allman; "On Making TCP More Robust to Packet Reordering," ACM Computer Communication Review, vol. 32, No. 1, pp. 20-30, Jan. 2002.

E. Ruetsche; "The Architecture of Gb/s Multimedia Protocol Adapter," ACM Computer Communication Review, vol. 23, No. 3, pp. 59-68, Jul. 1993.

Ed Anderson, et al.; "Performance of the CRAY T3E Multiprocessor," Proceedings of the 1997 ACM/IEEE conference on Supercomputing, pp. 1-17, San Jose, California; Nov. 16, 1997.

Edward D. Lazowska, David A. Patterson; "Computing Research: A Looming Crisis," ACM Computer Communication Review, vol. 35, No. 2, 2005, pp. 65-68, Jul. 2005.

Eric C. Cooper, et al.; "Protocol Implementation on the Nectar Communication Processor," ACM Computer Communication Review, vol. 20, No. 4, 10 pages, Sep. 1990.

Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.

F.F. Kuo; "The Aloha System," ACM Computer Communication Review, vol. 4, No. 1, pp. 5-8, Jan. 1974.

Gary S. Delp, et al.; "An Analysis of Memnet: An Experiment in High-Speed Shared-Memory Local Networking," ACM Computer Communication Review, vol. 18, No. 4, p. 165-174, Aug. 1988.

Gene Tsudik; "Message Authentication with One-Way Hash Functions," ACM Computer Communication Review, vol. 22, No. 5, pp. 29-38, Oct. 1992.

Gordon E. Moore; "Cramming more components onto integrated circuits," Electronics, vol. 38, No. 8, 4 pages, Apr. 1, 1965.

Greg Chesson; "The Evolution of XTP," Proceedings of the Third International Conference on High Speed Networking, pp. 1-10, Nov. 1991.

Greg Minshall, et al.; "Flow labelled IP over ATM: design and rationale," ACM Computer Communication Review, vol. 36, No. 3, pp. 79-92, Jul. 2006.

Greg Regnier, et al.; ETA: Experience with an Intel Xeon Processor as a Packet Processing EngineIEEE Micro, vol. 24, No. 1, pp. 24-31, Jan. 1994.

Greg Regnier, et al.; "TCP Onloading for Data Center Servers," Computer, IEEE Computer Society, vol. 37, No. 11, pp. 48-58, Nov. 2004.

Gregory G. Finn; "An Integration of Network Communication with Workstation Architecture," ACM Computer Communication Review, vol. 21, No. 5, 12 pages, Oct. 1991.

Gregory G. Finn and Paul Mockapetris; "Netstation Architecture Multi-Gigabit Workstation Network Fabric," Proceedings of InterOp '94, Las Vegas, Nevada; pp. 1-9, May 1994.

Gregory L. Chesson; "Declaration of Dr Gregory L Chesson in *Alacritech* v. *Microsoft*," United States District Court, Northern District California, San Francisco Division, 289 pages, Feb. 4, 2005.

H. K. Jerry Chu; "Zero-Copy TCP in Solaris," Proceedings of the USENIX Annual Technical Conference, 13 pages, Jan. 1996.

H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.

Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.

Humaira Kamal, et al.; "SCTP versus TCP for MPI," Proceedings of the 2005 ACM/IEEE conference on Supercomputing, Seattle, Washington, 14 pages, Nov. 12, 2005.

Ian Leslie and Derek R. McAuley; "Fairisle: An ATM Network for the Local Area," ACM Computer Communication Review, vol. 21, No. 4, pp. 327-336, Sep. 1991.

Ian M. Leslie, et al.; "The Architecture of the Universe Network," ACM Computer Communication Review, vol. 14, No. 2, pp. 2-9, Jun. 1984.

Ian Pratt and Keir Fraser; "Arsenic: A User-Accessible Gigabit Ethernet Interface," Proceedings of IEEE Infocom 2001, pp. 1-11; Apr. 22, 2001.

J. C. Mogul; "The Case for Persistent-Connection HTTP," ACM Computer Communication Review, vol. 25, No. 4, pp. 299-313, Oct. 1995.

J. Carver Hill; "Synchronizing Processors with Memory-Content-Generated Interrupts," Communications of the ACM, vol. 16, No. 6, p. 350-351, Jun. 1973.

J. Evans and T. Buller; "The End of History," IEEE TCGN Gigabit Networking Workshop, 10 pages, Apr. 22, 2001.

J. Vis; "A Simple LAN Performance Measure," ACM Computer Communication Review, vol. 24, No. 1, pp. 7-11, Jan. 1994.

Jack B. Dennis and Earl C. Van Horn; "Programming Semantics for Multiprogrammed Computations," Communications of the ACM, vol. 9, No. 3, pp. 143-155, Mar. 1966.

Jeffrey C. Mogul; "TCP offload is a dumb idea whose time has come," Proceedings of HotOS IX: The 9th Workshop on Hot Topics in Operating Systems, pp. 26-30, May 18, 2003.

Jeffrey R. Michel; "The Design and Evaluation of an Off-Host Communications Protocol Architecture," MSci Thesis, University of Virginia, 144 pages, Aug. 1993.

Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.

Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.

Joe Touch, et al.; "Experiences with a Production Gigabit LAN," Gigabit Networking Workshop '97 Meeting, Kobe, Japan, 10 pages, Apr. 1997.

Joe Touch, et al.; "Host-based Routing Using Peer DMA," Gigabit Networking Workshop '97 Meeting, Kobe, Japan, 2 pages, Apr. 1997.

John M. McQuillan, et al.; "An Overview of the New Routing Algorithm for the ARPANET," Proceedings of the 6th Data Communications Symposium, pp. 54-60, Nov. 1979.

John Nagle; "Congestion Control in IP/TCP Internetworks," ACM Computer Communication Review, vol. 14, No. 4, p. 11-17, Oct. 1984.

John Salmon, et al.; "Scaling of Beowulf-class Distributed Systems," Proceedings of the 1998 ACM/IEEE Conference on Supercomputing, Orlando, Florida, pp. 1-18, Nov. 7, 1998.

Jon Crowcroft; "10 Networking Papers: Recommended Reading," ACM Computer Communication Review, vol. 36, No. 2, pp. 31-32, Apr. 2006.

Jon Crowcroft, Derek McAuley; "ATM: A Retrospective on Systems Legacy," ACM Computer Communication Review, vol. 32, No. 5, pp. 11-21, Nov. 2002.

Jonathan Kay and Joseph Pasquale; "The Importance of Non-Data Touching Processing Overheads in TCP/IP," ACM Computer Communication Review, vol. 23, No. 4, 10 pages, Oct. 1993.

Jonathan M. Smith and C. Brendan S. Traw; "Giving Applications Access to Gb/s Networking," IEEE Network, vol. 7, Issue 4, 14 pages, Jul. 1993.

(56) References Cited

OTHER PUBLICATIONS

Jonathan Smith; "The Influence of ATM on Operating Systems," ACM Computer Communication Review, vol. 32, No. 5, pp. 29-37, Nov. 2002.
Jonathan Stone, Craig Partridge; "When the CRC and TCP Checksum Disagree," ACM Computer Communication Review, vol. 30, No. 4, 11 pages, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
K. Kleinpaste, P. Steenkiste, B. Zill; "Software Support for Outboard Buffering and Checksumming," ACM Computer Communication Review, vol. 25, No. 4, pp. 87-98, Oct. 1995.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, Rennes, France, 10 pages, Aug. 28, 2007.
L. S. Brakmo, et al.; "TCP Vegas: New Techniques for Congestion Detection and Avoidance," ACM Computer Communication Review, vol. 24, No. 4, pp. 24-35, Oct. 1994.
M. Allman; "TCP Byte Counting Refinements," ACM Computer Communication Review, vol. 29, No. 3, pp. 14-22, Jul. 1999.
M. de Vivo, et al.; "Internet Vulnerabilities Related to TCP/IP and T/TCP," ACM Computer Communication Review, vol. 29, No. 1, pp. 81-85, Jan. 1999.
M. Kaiserswerth; "The Parallel Protocol Engine," IEEE/ACM Transactions in Networking vol. 1, Issue 6, pp. 650-663, Dec. 1993.
M.V. Wilkes and R.M. Needham; "The Cambridge Model Distributed System," ACM SIGOPS Operating Systems Review, vol. 14, Issue 1, pp. 21-29, Jan. 1980.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
Mark David Hayter; "A Workstation Architecture to Support Multimedia," PhD Thesis, University of Cambridge, 111 pages, Sep. 1993.
Mark Hayter, Derek McAuley; "The Desk Area Network," ACM Operating Systems Review, vol. 25, Issue 4, pp. 1-11, Oct. 1991.
Marvin Zelkowitz; "Interrupt Driven Programming," Communications of the ACM, vol. 14, No. 6, p. 417-418, Jun. 1971.
Matthias Kaiserswerth; "The Parallel Protocol Engine," IEEE/ACM Transactions in Networking vol. 1, Issue 6, pp. 650-663, Dec. 1993.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Michael J. Dixon; "System support for multi-service traffic," University of Cambridge Computer Laboratory Technical Report, No. 245, pp. 1-108, Jan. 1992.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Nanette J. Boden, et al.; "Myrinet: A Gigabit-per-Second Local-Area Network," Draft of paper published in IEEE Micro, vol. 15, No. 1, pp. 1-15, Nov. 16, 1994.
NR Adiga, et al.; "An Overview of the BlueGene/L Supercomputer," Proceedings of the 2002 ACM/IEEE conference on Supercomputing, pp. 1-22, Baltimore; Nov. 16, 2002.
O. Angin, et al.; "Report on the 5th IFIP Internation Workshop on Quality of Service (IWQOS 97)," ACM Computer Communication Review, vol. 27, No. 3, pp. 100-117, Jul. 1997.

P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
P. Druschel, et al.; "Experiences with a High-Speed Network Adaptor: A Software Perspective," ACM Computer Communication Review, vol. 24, No. 4, pp. 2-13, Oct. 1994.
P. Kermani and L. Kleinrock; "Virtual cut-through: A new computer communciation switching technique," Computer Networks, vol. 3, No. 4, pp. 267-286, Sep. 1979.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Patrick Geoffrey; "A Critique of RDMA," HPCWire article: http://www.hpcwire.com/features/17886984.html, 7 pages, Aug. 18, 2006.
Paul E. McKenney and Ken F. Dove; "Efficient Demultiplexing of Incoming TCP Packets," ACM Computer Communication Review, vol. 22, No. 4, pp. 269-279, Oct. 1992.
Paul Ronald Barham; "Devices in a Multi-Service Operating System," PhD Thesis, University of Cambridge, 142 pages, Jul. 1996.
Paul V. Mockapetris, Kevin J. Dunlap; "Development of the Domain Name System," ACM Computer Communication Review, vol. 18, No. 4, pp. 112-122, Aug. 1988.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Peter Steenkiste; "Analyzing Communication Latency using the Nectar Communication Processor," ACM Computer Communication Review, vol. 22, No. 4, pp. 199-209, Oct. 1992.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
R. Braden, et al.; "Computing the Internet Checksum," ACM Computer Communication Review, vol. 19, No. 2, pp. 86-94, Apr. 1989.
R. Bush, D. Meyer; "Some Internet Architectural Guidelines and Philosophy," IETF Network Working Group, Request for Comments: 3439, pp. 1-25, Dec. 2002.
R. J. Black, I. Leslie, and D. McAuley; "Experiences of Building an ATM Switch for the Local Area," ACM Computer Communication Review, vol. 24, No. 4, pp. 158-167, Oct. 1994.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Raj K. Singh, et al.; "A Programmable Network Interface for a Message-Based Multicomputer," ACM Computer Communication Review, vol. 24, No. 3, pp. 8-17, Jul. 1994.
Robert M. Brandriff, et al.; "Development of a TCP/IP for the IBM/370," ACM Computer Communication Review, vol. 15, No. 4, pp. 2-8, Sep. 1985.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE conference on Supercomputing, Denver, CO, 17 pages, Nov. 10, 2001.
S. L. Pope, et al.; "Enhancing Distributed Systems with Low-Latency Networking," Parallel and Distributed Computing and Networks, Brisbane, Australia, pp. 1-12, Dec. 1998.
Sally Floyd; "TCP and Explicit Congestion Notification," ACM Computer Communication Review, vol. 24, No. 5, p. 8-23, Oct. 1994.

(56) References Cited

OTHER PUBLICATIONS

Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.

Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.

Steve Muir and Jonathan Smith; "Piglet: A Low-Intrusion Vertical Operating System," Technical Report MS-CIS-00-04, University of Pennsylvania, 2000, pp. 1-15, Jan. 2000.

Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.

Steven Pope, David Riddoch; "10Gb/s Ethernet Performance and Retrospective," ACM Computer Communication Review, vol. 37, No. 2, pp. 89-92, Mar. 19, 2007.

Stuart Wray, et al.; "The Medusa Applications Environment," Proceedings of the International Conference on Multimedia Computing and Systems, Boston, MA, 9 pages, May 1994.

Sumitha Bhandarkar, et al.; "LTCP: Improving the Performance of TCP in Highspeed Networks," ACM Computer Communication Review, vol. 36, No. 1, pp. 41-50, Jan. 2006.

Thomas Sterling, et al.; "Beowolf: A Parallel Workstation for Scientific Computation," Proceedings of the 24th International Conference on Parallel Processing, pp. 1-4, Aug. 1995.

Thorsten von Eicken, et al.; "U-Net: A User-Level Network Interface for Parallel and Distributed Computing," ACM Operating Systems Review, vol. 29, Issue 5, pp. 40-53, Dec. 1995.

Tom Kelly; "Scalable TCP: Improving Performance in Highspeed Wide Area Networks," ACM Computer Communication Review, vol. 33, No. 2, pp. 83-91, Apr. 2003.

V. Cerf, et al.; "Proposal for an International End-to-End Protocol," ACM Computer Communication Review, vol. 6 No. 1, pp. 63-89, Jan. 1976.

V. Jacobson; "Congestion Avoidance and Control," ACM Computer Communication Review, vol. 18, No. 4, pp. 157-173, Aug. 1988.

Various forum members; "MPI: A Message-Passing Interface Standard," Message-Passing Interface Forum, University of Tennessee, Knoxville, 236 pages, May 5, 1994.

Vinay Aggarwal, et al.; "Workshop on network-I/O convergence: experience, lessons, implications (NICELI)," ACM Computer Communication Review, vol. 33, No. 5, pp. 75-80, Oct. 2003.

Vinton Cerf, Robert Kahn; "A Protocol for Packet Network Intercommunication," IEEE Transactions on Communications, vol. COM-22, No. 5, 13 pages, May 1974.

W. E. Leland, et al.; "On the Self-Similar Nature of Ethernet Traffic," ACM Computer Communication Review, vol. 23, No. 4, pp. 183-193, Oct. 1993.

W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.

W. Feng, et al.; "Performance Characterization of a 10-Gigabit Ethernet TOE," Proceedings of the 13th Symposium on High Performance Interconnects, pp. 1-6, Aug. 17, 2005.

Wu-chun Feng, et al.; "Optimizing 10-Gigabit Ethernet for Networks of Workstations, Clusters, and Grids: A Case Study," Proceedings of the 2003 ACM/IEEE conference on Supercomputing, Phoenix, Arizona, 13 pages, Nov. 15, 2003.

Geoffray, P., "Protocol Off-Loading vs On-Loading in High-Perfomance Networks," Hot Interconnects 2006, 14th Symposium on High Performance Interconnects, Aug. 23, 2006, 5 pages.

Dickman, L., "Protocol OffLoading vs OnLoading in High Performance Networks," Hot Interconnects Panel, 14th Symposium on High Performance Interconnects, Aug. 23, 2006, 7 pages.

Petrini, F., "Protocol Off-Loading vs On-Loading in High-Performance Networks," Hot Interconnects 2006, 14th Symposium on High Performance Interconnects, Aug. 23, 2006, 4 pages.

Reginer, G., "Protocol Onload vs. Offload," Hot Interconnects 2006, 14th Symposium on High Performance Interconnects, Aug. 23, 2006, 1 page.

Montry, G., "Open Fabrics Alliance," www.openfabrics.org, Hot Interconnects 2006, 14th Symposium on High Performance Interconnects, Aug. 23, 2006, 8 pages.

EP-13166143.1-1862, Extended European Search report dated Jul. 9, 2013, 8 pages.

* cited by examiner

AVOIDING DELAYED DATA

CROSS REFERENCE TO OTHER APPLICATIONS

This application claims the benefit of prior U.S. Provisional Patent Application No. 61/641,575, filed 2 May 2012, which application is incorporated herein by reference in its entirety.

BACKGROUND

The invention relates to apparatus and methods for avoiding delayed data being delivered to a network endpoint.

Data processing systems connected together over a network exchange messages in accordance with one or more network protocols or combinations of network protocol layers. For example, personal computers connected to the internet communicate with one another by at least TCP/IP. Network protocols typically make a best effort to deliver network messages to a network endpoint even if that means that a network message arrives late or out of order at its destination. This is because generally it is most important that a network is reliable.

However, the techniques used to ensure that a network protocol is reliable can often result in messages being delayed. In addition, physical factors such as physical breaks in connectivity, faulty equipment, or the distance of transmission can contribute to message delays and lead to messages arriving significantly after the transmitting software might have expected.

For many applications, the reliability of a network connection will be paramount and occasional message delays can be tolerated. For other applications, however, delayed messages are to be avoided and it is preferable that messages are discarded rather than arriving late at their destination. An example application where it is of particular importance to avoid delayed messages is in electronic financial markets. In these situations there is a generally a financial advantage to making trades ahead of competitors since the trades are typically placed in very rapidly moving markets and the margin on any given trade is small. In order to execute a trade, a trading platform transmits messages over a network to an electronic exchange. If those messages are delayed the market conditions on which the trade was predicated could shift and the trade represented by the messages could change from being favourable to detrimental.

There is therefore a need for methods that enable applications to avoid delayed messages being delivered to a network endpoint. However, since the protocols in use over trading networks are well established it is important that such methods are compatible with existing network protocols.

SUMMARY OF THE INVENTION

According to a first aspect of the present invention there is provided a data processing system for selectively transmitting data onto a network, the data processing system comprising: an application configured to form data for transmission and cause a timestamp to be generated and associated with the data for transmission; a network protocol stack configured to form the data for transmission into one or more network messages for transmission over a network connection, the one or more network messages being associated with the timestamp; and a delay determination unit configured to, immediately prior to the one or more network messages being transmitted onto the network by means of a network interface device, check the timestamp to determine the time elapsed from the time represented by the timestamp and, if the time elapsed is greater than a maximum period, cause the one or more network messages to be discarded.

Preferably the network protocol stack is configured to generate the timestamp in response to the application requesting transmission of the data for transmission. Preferably the application is configured to request transmission of the data for transmission by means of one or more calls to a socket library. Alternatively the application is configured to generate the timestamp on forming the data for transmission and the network protocol stack is configured to receive the timestamp on accessing the data for transmission. Preferably the timestamp indicates the time at which the timestamp is generated.

Preferably the network protocol stack is configured to include the timestamp in the one or more network messages, optionally in the metadata of the one or more network messages.

Preferably the delay determination unit is provided at the network interface device. Preferably the delay determination unit is provided at the interface controller of the network interface device.

Preferably the network interface device includes a DMA controller and the delay determination unit is configured to check the timestamp in response to the DMA controller retrieving the one or more network messages from a transmit queue of the data processing system Alternatively the network protocol stack includes the delay determination unit and the delay determination unit is configured to check the timestamp on queuing the one or more network messages at a transmit queue for retrieval by the network interface device.

Suitably, on discarding the one or more network messages, the network connection is reset or the transmission of any further network messages over the network connection is disabled.

Preferably the network protocol stack is configured to notify the application if the one or more network messages are discarded.

Preferably the network protocol stack is configured to, on generating a network message for retransmission, include in the network message for retransmission the timestamp included in the original network message for transmission.

Preferably the data processing system further comprises a control interface by means of which the application can specify the maximum period to the delay determination unit for the network connection or in respect only of the data for transmission.

Preferably the control interface is further configured to, in response to a suitable request from the application, cause the network protocol stack to indicate to the application those network messages that have been discarded by the delay determination unit.

Preferably the control interface is further configured to, in response to a suitable request from the application, cause the network protocol stack to indicate to the application whether the network connection has been reset or disabled.

Preferably the delay determination unit is configured to, if the time elapsed does not exceed the maximum period, allow the one or more network messages to be transmitted onto the network by means of the network interface device, and the network protocol stack is configured to, on an acknowledgement message being received from the remote endpoint of the network connection indicating that the remote endpoint has received one or more of the network messages, generating an acknowledgment timestamp so as to record when the acknowledgement message is received at the data processing system.

Preferably the control interface is further configured to, in response to a suitable request from the application, cause the network protocol stack to provide a representation of the acknowledgment timestamp to the application.

Suitably the application is further configured to provide the maximum period to the network protocol stack with the data for transmission.

Preferably the delay determination unit is configured to, on causing one or more network messages to be discarded, cause an event indicating which network messages have been discarded to be written to an event queue of the application.

According to a first aspect of the present invention there is provided a method for selectively transmitting data onto a network from a data processing system supporting at least one application and a network interface device, the at least one application being operable to transmit data over a network by means of the network interface device, the method comprising: forming data for transmission at an application; generating a timestamp and associating the timestamp with the data for transmission; subsequently, forming the data for transmission into one or more network messages for transmission over the network, the one or more network messages being associated with the timestamp; and immediately prior to the one or more network messages being transmitted onto the network, checking the timestamp to determine the time elapsed from the time represented by the timestamp and, if the time elapsed is greater than a maximum period, causing the one or more network messages to be discarded.

According to a second aspect of the present invention there is provided a method for avoiding retransmission of network messages at a data processing system supporting an application and a network protocol stack operable to transmit network messages in accordance with a network communication protocol supporting message retransmission, the method comprising: forming a network message from data provided by an application; the application indicating that retransmissions are to be disabled in respect of the network message; the network protocol stack causing the network message to be transmitted over a network connection; and on the expiry of a retransmission period without an acknowledgement being received at the network protocol stack in respect of the transmitted network message, the network protocol stack discarding the network message and abandoning the message retransmission.

Suitably the expiry of the retransmission period is indicated by the expiry of a retransmission timer established by the network protocol stack. Alternatively the expiry of the retransmission period is indicated by a notification received from the remote endpoint of the network connection that the network message has not been received.

Preferably the network communication protocol is TCP and the method further comprises, if a plurality of duplicate TCP acknowledgement messages are received prior to the expiry of the retransmission period, the network protocol stack suppressing retransmission of the network message according to the TCP fast retransmission algorithm.

Preferably the application is configured to indicate to the network protocol stack that retransmissions are to be disabled in respect of the network connection by means of a control interface. Alternatively the application is configured to indicate to the network protocol stack that retransmissions are to be disabled in respect of the network message by means of a notifier provided with the data from which the network message is formed.

According to a third aspect of the present invention there is provided a method for filtering data in a communication system comprising first and second data processing systems connected to a network, each of the first and second data processing systems supporting an application and a network interface device, the method comprising: at a first data processing system: signaling to a second data processing system a first maximum period; forming a network message from data provided by an application of the first data processing system, the network message including a timestamp; and a network interface device of the first data processing system transmitting the network message over a network connection to the second data processing system; and at the second data processing system: receiving the network message; determining the time elapsed since the time represented by the timestamp; and if the time elapsed since the time represented by the timestamp exceeds the first maximum period, discarding the network message.

Preferably the step of forming the network message is performed at a network protocol stack of the first data processing system configured to generate the timestamp in response to the application of the first data processing system requesting transmission of the data. Preferably the timestamp indicates the time at which the timestamp is generated. Preferably the network protocol stack is configured to include the timestamp in metadata of the network messages.

Suitably the step of signaling the first maximum period comprises including the first maximum period in metadata of the network messages.

The step of signaling the first maximum period could comprise signaling the first maximum period in respect of: the network message, the network connection, and all of the network connections of the application at the first data processing system.

Preferably the step of signaling the first maximum period is performed during negotiation of the network connection. Suitably the network connection is a TCP connection and the signaling step is performed during the SYN/SYN-ACK handshake.

Suitably the step of discarding the network message comprises closing the network connection or disabling transmission of any further network messages over the network connection.

Preferably the step of determining the time elapsed since the time represented by the timestamp is performed in response to an application at the second data processing system requesting reception of the network message, the application at the second data processing system being the endpoint of the network connection.

Preferably the application at the second data processing system requests reception of the network message by means of a socket library of the second data processing system.

Preferably the method further comprises, prior to transmitting the network message, the first data processing system: determining the time elapsed since the time represented by the timestamp; and if the time elapsed since the time represented by the timestamp exceeds a second maximum period, discarding the network message and not transmitting the network message over the network connection.

Preferably the method further comprises the step of synchronising clocks at the first and second data processing systems in accordance with an IEEE 1588 protocol.

Preferably the method further comprises, if the time elapsed since the time represented by the timestamp exceeds the first maximum period, a network protocol stack of the second data processing system notifying the application of the first data processing system that the network message has been discarded.

Preferably notifying the application that the network message has been discarded comprises indicating to the application of the first data processing system that the network message has not been delivered to its endpoint and/or that the network connection has been reset and/or that further transmissions over the network connection have been disabled.

Preferably the method further comprises, at the second data processing system, if the time elapsed since the time represented by the timestamp does not exceed the first maximum period: delivering the network message to an application of the second data processing system; forming a notification message including an indication of the time at which the network message is delivered to the application of the second data processing system; and transmitting the notification message to first data processing system.

Preferably the notification message is directed to a network protocol stack of the first data processing system and the application of the first data processing system is operable to access the indication of the time at which the network message is delivered by means of a control API at the first data processing system.

BRIEF DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to methods and apparatus for ensuring that delayed network messages are not sent or received if the delay exceeds a specified or predetermined length of time. The present invention is described by way of example with reference to the TCP communication protocol in particular, but its use is not limited to any particular protocol and the methods described herein could be employed with any suitable protocol known in the art. The network protocol processing stacks described herein could be any kind of protocol stack, including a hardware stack supported at a network interface device, a kernel or user-level software stack, or a stack comprising any combination of hardware and software protocol processing elements.

Figure 1:
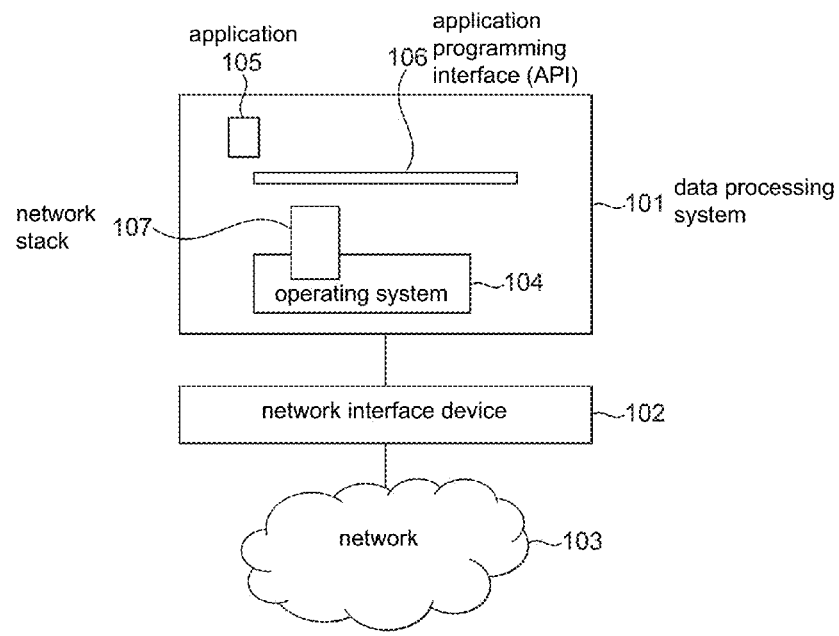
FIG. 1 is a schematic drawing of a data processing system and network interface device configured in accordance with the first and second aspects of the present invention.

A data processing system 101 and network interface device 102 configured in accordance with the present invention are shown in FIG. 1. Network interface device 102 provides an interface to network 103 for data processing system 101. The data processing system comprises an operating system 104 supporting at least one application 105, and a network protocol stack 107 configured to perform processing in accordance with the one or more network protocols in use over network interface device 102. The network protocol stack could be, for example, provided at the operating system as a kernel level software entity, in the application domain as a user level network stack, in hardware at the network interface device or other peripheral device, or at a combination of any of these as a set of interacting protocol processing elements.

As is well known in the art, application 105 is configured to transmit and receive data by means of requests to a suitable application programming interface (API) 106. For example, on a Linux system transmit and receive operations can be performed by an application using send( ) and recv( ) calls to a socket library API. Thus, when application 105 has data to transmit it makes a call to API 106 so as to request transmission of that data. Typically the call includes a reference to the location of the data to be transmitted in host memory and an indication of the destination to which the data is to be transmitted. This information allows network stack 107 to access the data for transmission and perform the necessary protocol processing in order to properly form the data into one or more network messages for transmission over network 103.

When an application requests transmission of data by means there is generally some delay before a network message comprising that data is physically transmitted onto the wire over network 103. A small intrinsic delay is inescapable due to the finite time it takes to perform packet processing at the stack and to pass data to the network interface device. This delay can at times be exacerbated by a lack of available processor cycles for the network stack and congestion at the host memory or peripheral buses, but these delays can be minimised through good design of the data processing system and network interface device.

With modern computer systems, the most significant delays to the transmission of data onto the network tend to be a result of constraints imposed by the network hardware or the protocols in use on the network. For example, there may be constraints imposed on how much data can be "in flight" on a given network segment, or network hardware can become busy servicing other requests to push messages onto the network. To give two particular examples:

the TCP protocol uses the concepts of a receive window and a congestion window to limit the rate at which a sender can push data onto a network;

Ethernet networks require the use of ARP (Address Resolution Protocol) to discover the MAC address of one or more other hosts before an Ethernet packet can be transmitted.

Even with good network design, the transmission of network messages can often be delayed and a host must therefore queue data packets until it is possible for the messages to be sent. In many scenarios such delays are acceptable, however, as has been discussed, for applications such as high speed financial trading such delays can mean the difference between profit and loss.

A first aspect of the present invention provides a mechanism by which network messages that are delayed by greater than a specified or predetermined length of time are prevented from being transmitted onto the network. Data processing system 101 is configured to timestamp data for transmission on the application requesting that the data is transmitted over the network. Preferably this is performed by network protocol stack 107 in response to a call from application 105 to API 106. The call could be a conventional call to request transmission of data (e.g. a send( ) call) with the network stack being configured to perform the timestamp in response. In preferred embodiments, network protocol stack 107 is a user level stack and API 106 is a socket library or interposed library configured to intercept socket calls directed to a socket library provided by the operating system 104.

Alternatively, the timestamp could be performed by the application itself or at any other entity of the data processing system and passed to the network stack for inclusion in the respective network messages. For example, API 106 could be an API provided specifically to allow the application to pass timestamps to the network stack or to allow the application to request that some entity of the system perform the timestamp and associate the timestamp with the data for transmission.

The timestamp indicates the time at which the application requested the transmission of the data/the timestamp (from the point of view of either the application or the timestamping entity) or the time at which the application itself formed the data. The timestamp is associated at the network stack with the application data for transmission and when the network stack forms the application data into one or more messages for transmission over the network, the network stack maintains the association of the timestamp with the network message. This is preferably achieved by including the timestamp (or a representation thereof) in the network message.

The timestamp could be included in the payload data of a network packet, the headers of a network packet, or it could be merely associated with a network message at the network stack. It can be advantageous to include the timestamp in the metadata of the network message so as to not interfere with conventional processing of the network message at the receiver in accordance with the network protocols in use over the connection. For example, if the network message is formed in accordance with the TCP protocol, the timestamp could be included in a TCP option field of the TCP header.

As has been discussed above, once the network stack has formed the application data into one or more network messages the messages are typically enqueued at transmit queues to await transmission by the network interface device. Note that the network messages are not necessarily complete since additional protocol processing layers may be performed by other elements of the data processing system or network interface device (e.g. the NIC would typically be configured to complete one or more checksums for the network message). When it is possible for a network message to be transmitted over the network, its timestamp is checked in order to determine whether the delay experienced by the message is less than a predetermined or specified maximum delay: if not, the message is discarded so as to avoid transmitting stale messages onto the network. For example, if the application requested transmission at timestamp t1 and the network interface device performed a check of the timestamp at t2, the network message would be discarded if the time difference between t1 and t2 is greater than the predetermined or specified maximum delay.

Preferably the network interface device includes a delay determination unit configured to perform the timestamp check on retrieving the network message for transmission over the network (typically the network message would be held at a transmit queue in host memory, but it could be at a buffer of the network interface device). For example, the network interface device could be configured to perform the timestamp check in response to retrieving a network message from a transmit queue of the host by DMA. Most preferably, the timestamp check is performed at an interface controller of the network interface device. Alternatively, an entity of the data processing system (e.g. part of the network stack or a kernel driver) could include the delay determination unit and perform the timestamp check prior to queuing the message for transmission. If the timestamp is carried in the network message, the timestamp could be stripped from the message once the check has been performed.

The maximum delay could be a predetermined value set at the entity configured to perform the timestamp check but preferably the maximum delay is specified by the application since this allows the application to select a value suitable for the network connection. Thus, if the application were executing trades over one or more connections, the application could specify a maximum delay for those connections such that stale trades that risk making a loss are not transmitted onto the network. The application could be configured to specify a maximum delay on a per message basis, and this maximum delay value could be provided with each network message for transmission—for example, a maximum delay value could be included with the timestamp in metadata of the network message.

It is advantageous if a control API is provided to allow the application, operating system or other entity of the data processing system to set the maximum delay system-wide (i.e. for all messages on all connections), or on a per connection or per packet basis. The control API could form part of API 106 through which the application requests data transmission, or could be a separate API provided at the data processing system. The control API would provide an interface to one or more software libraries through which the network interface device (or other entity configured to perform the timestamp checking) can have its maximum delay parameter(s) configured.

The control API could provide an interface by means of which the application or network stack could discover which messages are discarded due to having been delayed by greater than the respective maximum delay. Alternatively and preferably, the entity configured to check the timestamp is configured to cause an event message to be passed up to the application and/or network stack so as to indicate to the application which network messages have been discarded. The application/network stack could have a dedicated event queue to receive such messages. Alternatively, any other notification mechanisms known in the art could be used to pass indications to the application/network stack as to which messages have been discarded.

It can be advantageous if the network protocol stack is configured to monitor the acknowledgements received in respect of network messages subject to the above described timestamp mechanism. The network protocol stack could be configured to timestamp acknowledgements received over such a network connection (e.g. for a TCP connection, ACK packets) or record the time at which such acknowledgements are received. This behaviour can be useful if the remote endpoint does not support the timestamping mechanism described below in relation to the third aspect of the present invention, since it allows the transmitting system to at least roughly identify when the remote endpoint is likely to be receiving its network messages. Most preferably, the control API would be configured to provide the acknowledgement timestamps to the application in response to one or more predetermined calls from the application to the API.

Since many network protocols require that data packets are received in order (e.g. TCP), it may be necessary to at least partially take down a connection if a network message is discarded. If the network protocols in use over a connection allow, it is preferable that a connection continues when a message is discarded in accordance with the mechanism described herein. However, if the network protocols in use over a connection do not allow such behaviour, the network connection is either closed (and the transmission of all remaining messages for transmission over that connection abandoned) or, preferably, the sending of the discarded network message and all subsequent network messages is disabled for that connection (i.e. the connection is maintained sufficient to receive network messages such as acknowledgements, but transmission is disabled). Preferably the application can select whether in such circumstances a connection is closed or merely disabled for transmissions—this could be by means of the control API. In cases in which a network connection is closed or transmission over a network connection is disabled, the application or network stack can be informed by any of the notification mechanisms discussed above, with the notification of the network message at which the connection was closed or disabled typically being sufficient to notify the application/network stack of all of the network messages which have been abandoned or discarded.

Many network protocols provide message retransmission mechanisms to improve the reliability of network connections and deal with the occasional loss of messages on the network. Any message that is dropped and later retransmitted will inevitably be subject to a delay at least equal to the retransmission period. Furthermore, with network protocols that require messages to be delivered in order, message retransmission may affect subsequent messages on the same connection as those messages may need to wait for the missing message before being received at the destination endpoint.

A second aspect of the present invention provides a mechanism by which an application can disable message retransmissions. This mechanism could be used with a data processing system and network interface device configured in accordance with the first aspect of the present invention. Application 105 is able to indicate to network protocol stack 107 that retransmissions are to be disabled—this indication could be in respect of one or more network connections or on a per message basis. This indication does not cause the network stack to modify the network protocols in use over the respective connections and, if a network protocol supports message retransmissions, the protocol will proceed to set up retransmission timers etc. in the usual manner. However, in response to receiving the indication that retransmissions are to be disabled, network stack 107 is configured to discard any network messages that are retransmissions of earlier messages and end the retransmission process. In this manner, no retransmission of network messages occurs for those connections or network messages identified in the application's indication.

The application could be configured to indicate that retransmissions are to be disabled in respect of data for transmission by passing a suitable request to the network stack. Such a request could be made by any suitable mechanism known in the art, including by means of an API such as the control API discussed above, or an extension to socket library API that allows the application to indicate whether retransmissions are to be disabled in respect of data for transmission or one or more connections when the application requests that the respective data is transmitted. Alternatively, the application could be configured to set a flag (e.g. in memory or at a file) to indicate whether transmissions are to be disabled for data or for one or more connections, with the network stack being configured to check the flag on retrieving the respective data from the application buffers.

Network protocols use different mechanisms for scheduling message retransmissions. For example, some protocols (such as TCP) set a timer once a message is transmitted and if that message is not acknowledged within a certain period, the message is retransmitted. Multiple retransmissions are possible and generally the retransmission period is chosen to be slightly longer than the total round-trip required for a transmitter and receiver to exchange messages—typically at least 200 ms. Other protocols arrange that retransmission occurs on a message being receive from the remote endpoint of a connection indicating that an expected message has not been received within a certain period of time and/or that messages have been received out of order. The second aspect of the present invention can be used with whichever mechanism is used to determine when a message is to be retransmitted: when that retransmission is due to occur the network stack does not perform the retransmission and discards the message.

TCP in particular provides a second so-called "fast retransmission algorithm" according to which message loss can be indicated by a remote receiver by means of a sequence of (usually 3) duplicate acknowledgements. When a TCP transmitter receives such a sequence of duplicate acknowledgements in respect of a message the transmitter is generally being informed that the receiver has not received the message and so retransmits the message. However, false positives are common with fast TCP retransmissions and for many applications it can be advantageous to avoid such retransmission behaviour. It is therefore preferable that, for connections or messages using the first aspect of the present invention, the network stack is configured to suppress the retransmission of data packets according to the fast retransmission algorithm. This avoids network messages being discarded and/or network connections being taken down unnecessarily due to false positives—if a network message truly is lost the TCP retransmission timer will eventually expire and the message will be discarded at this point.

As described above in relation to the first aspect of the present invention, it is preferable that means are provided to notify the application as to which network messages have been discarded. In the case that the application is an electronic trading system, this allows the system to keep track of which trades were transmitted onto the network and at least attempted to be placed at the electronic exchange. Any of the notification means described above in relation to the first aspect of the present invention could be used to notify that retransmission data packets have been discarded.

Furthermore, for the same reasons set out in relation to the first aspect of the present invention, for certain network protocols it will be necessary to at least partially take down a connection if a network message is discarded. If the network protocols in use over a connection allow, it is preferable that a connection continues when a message is discarded in accordance with the mechanism described herein. However, if the network protocols in use over a connection do not allow such behaviour, the network connection is either closed (and the transmission of all remaining messages for transmission over that connection abandoned) or, preferably, the sending of the discarded network message and all subsequent network messages is disabled for that connection (i.e. the connection is maintained sufficient to receive network messages such as acknowledgements, but transmission is disabled). Preferably the application can select whether in such circumstances a connection is closed or merely disabled for transmissions— this could be by means of the control API. In cases in which a network connection is closed or transmission over a network connection is disabled, the application or network stack can be informed by any of the notification mechanisms discussed above, with the notification of the network message at which the connection was closed or disabled typically being sufficient to notify the application/network stack of all of the network messages which have been abandoned or discarded.

The first and second aspects of the present invention are preferably combined. In such a system the retransmission of a message can be permitted if when the retransmitted message is to be transmitted the total delay since the original message was formed/requested does not exceed the predetermined or specified maximum delay allowed for the original message. This can be arranged by enforcing the timestamp check mechanism of the first aspect of the present invention for retransmission messages and configuring the network stack to ensure that the timestamp carried in the original message is copied over to the retransmission message. If when a retransmission message is to be transmitted the timestamp check reveals that the retransmission message is delayed by more than the predetermined or specified maximum delay (which would be very likely for electronic trading systems), the retransmission message is discarded.

Sometimes, even when a message has been successfully transmitted onto a network within the maximum delay period of the first aspect of the present invention, the message can experience delays traversing the network and will not arrive at the receiver in a timely fashion. As an addition to or an alternative to the first aspect of the present invention, a third aspect of the present invention is provided according to which a receiver is configured to discard messages whose reception is delayed by more than a predetermined or specified length of time.

Figure 2:
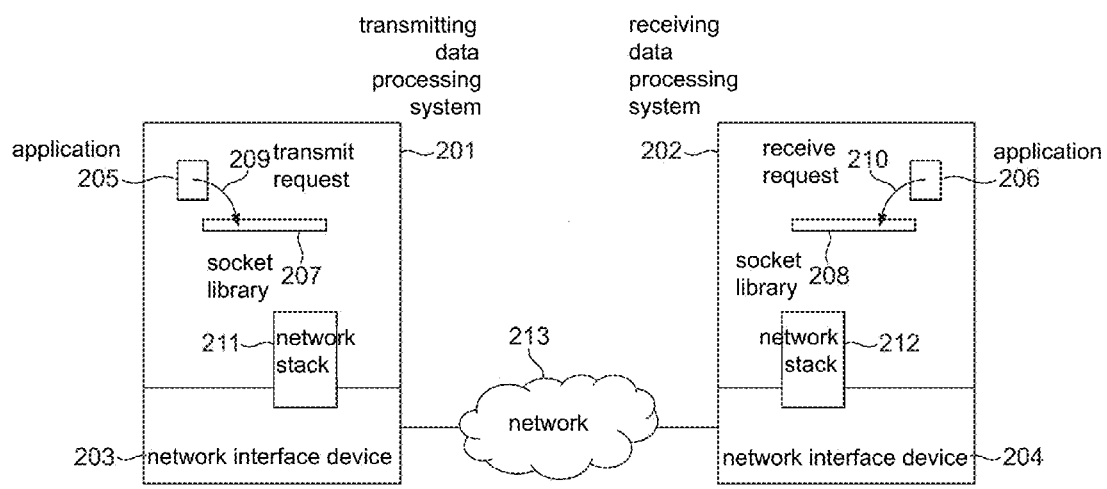
FIG. 2 is a schematic drawing of a data processing system configured in accordance with the third aspect of the present invention.

A transmitting data processing system 201 and a receiving data processing system 202 are shown connected by a network 213 in FIG. 2. Transmitting system 201 is configured to cause network messages transmitted onto the network by network interface device 203 to be timestamped with an indication of the time when application 205 formed the data for transmission or requested transmission of that data. This timestamping can be performed according to any of the mechanisms described in relation to the first aspect of the present invention, provided that the timestamp is included in the message transmitted over the network.

In a preferred embodiment, network stack 211 is configured to timestamp data for transmission on the application 205 requesting that that data is transmitted. The application would generally make such a transmit request 209 by means of socket library 207. The timestamp is a representation of the time at which the network stack receives the transmit request and is subsequently included in the one or more network messages formed in respect of the data to be transmitted. Preferably the timestamp is included in metadata of the network messages—for example, if the messages are being transmitted in accordance with the TCP protocol, the timestamp could be included in a TCP option field.

Network messages transmitted from transmitter system 201 over network 213 are received at the network interface device 204 of the receiver system 202 and the timestamp is checked at a delay determination unit in order to determine whether the time elapsed since the time represented by the timestamp exceeds a predetermined or specified maximum delay. The delay determination unit could be at the network interface device. For example, the timestamp check could be performed at a controller of network interface device 204 on receiving the message or on writing the message to a receive queue of the host data processing system 202. The important aspect of the receiver behaviour is that the received message is not delivered to its endpoint if it has been delayed by greater than the maximum delay.

Preferably the delay determination unit is provided at receiver network stack 212 or another entity of the data processing system. For example, generally the endpoint would be an application 206 configured to submit receive requests 210 (e.g. a recv( ) call) to a socket library 208 so as to cause messages receive for the application to be delivered into its buffers. The timestamp check of received messages is most preferably performed at the network stack in response to such a receive request from application 206 (or the operating system or another software entity of the system). It is further preferable that the timestamp check is performed in response to requests for the presence of available data for the application, such as poll( ) select( ) etc. The stack could be configured to check the timestamps of all of the messages held at a receive queue in response to a receive request or request to test the presence of data at the receive queue. The socket library would preferably maintain a record of the messages that have been checked in order to avoid duplication of effort.

The receiver could check received timestamps against a predetermined default maximum delay but preferably the transmitting system is able to indicate to the receiving system the desired maximum delay on a system-wide basis (i.e. for all its connections), on a per connection basis, or on a per message basis. The transmitting entity, for example application 206, could be configured to provide a maximum delay to the network stack 211 for inclusion in the respective network messages (e.g. in the metadata of the messages). Preferably, the application (and any other entities at the transmitting system) is provided with an API by means of which the application/other entity can specify the desired maximum delay for each or all of its connections. This API could be the control API discussed above.

It is advantageous if the network stacks of the transmitter and receiver are configured to negotiate the use of timestamp enforcement at the receiver. This would establish whether the receiver and transmitter support this feature and therefore whether (a) the transmitter need timestamp network messages and (b) the receiver need perform timestamps checks. This negotiation could be performed by means of a dedicated handshake protocol during connection setup or through extension of an existing handshake process. For example, the negotiation could be performed as part of the SYN/SYN-ACK connection opening handshake for a TCP connection. The transmitter and receiver could advertise to one another whether they support the timestamp feature and optionally specify a value for the maximum permitted delay. If both ends support the feature then it can be used on the connection; otherwise it is not used (though the transmitter could still generate timestamps for enforcement at the transmitter in accordance with the first aspect of the present invention).

As described above in relation to the first aspect of the present invention, it is preferable that means are provided to notify the transmitting application as to which network messages have been discarded. In the case that the application is an electronic trading system, this allows the system to keep track of which trades were transmitted onto the network and at least attempted to be placed at the electronic exchange. This can be achieved by arranging that the network stack of the receiver is configured to transmit one or more messages to the transmitter identifying the discarded messages and/or the disablement or closure of the connection.

It can also be useful to arrange that the receiving system notify the transmitting when network messages are delivered to their endpoint. This can be achieved by arranging that the network stack of the receiving system form network messages or acknowledgement data packets comprising an indication of the time (e.g. a timestamp) at which one or more network messages were delivered to their endpoint. For example, for a TCP connection, a reception timestamp could be included in an ACK returned to the transmitting system. Such messages/acknowledgements could be delivered to the transmitting application or, preferably, to the network stack of the transmitting system and be accessible to the application by means of a suitable software interface. In the case in which the transmitting application is trading software, this mechanism allows the trading software to better form a picture of the delay its messages are experiencing and place trades accordingly.

A control API (which could be the same API as discussed above) could provide means by which the application could query when (and whether) each network message it transmits reaches its endpoint, based on the notifications/acknowledgements received by the network stack. If the receiving system does not support such a notification mechanism, the control API could be configured to indicate whether a network message is received at the receiving system—typically this would be reported by an acknowledgement message (e.g. for TCP, an ACK message is returned to the sender when a message is received by the receiving stack). The time at which the ACK message is received at the transmitting protocol stack could additionally be reported to a querying application.

Furthermore, for the same reasons set out in relation to the first and second aspects of the present invention, for certain network protocols it will be necessary to at least partially take down a connection if a network message is discarded. If the network protocols in use over a connection allow, it is preferable that a connection continues when a received message is discarded in accordance with the mechanism described herein. However, if the network protocols in use over a connection do not allow such behaviour, the network connection is either closed (and the transmission of all remaining messages over that connection by the transmitter is abandoned) or, preferably, the received network message is discarded and the transmission of subsequent network messages by the transmitter is disabled for that connection (i.e. the connection is maintained as a one-way connection allowing the receiver system to transmit messages such as acknowledgements to the transmitter system, but the transmitter is not permitted to continue transmitting messages to the receiver). The application could be configured a connection is taken down or only that transmissions are disabled during negotiation of a connection.

In order for the receiving system to accurately determine from its timestamp the delay experienced by a network message, the clocks of the receiving and transmitting systems must be synchronised. This could be achieved using one of the IEEE 1588 Precision Time Protocols.

In preferred embodiments of the present invention, the first and third aspects of the present invention are combined such that the timestamp of a message is checked at both the transmitting and receiving systems. There could be separate timestamps for the transmitter and receiver, i.e. the timestamp described in relation to the first aspect of the present invention could be different to the timestamp described in relation to the third aspect of the present invention. It is preferable, however, that these timestamps are one and the same. Similarly, both receiver and transmitter could use the same or different maximum delay values.

Most preferably, the first, second and third aspects of the present invention can be combined such that the timestamp of a message is checked at both the transmitting and receiving systems and retransmission messages are discarded or transmitted only if the net delay experienced by the data carried in the retransmission message does not exceed the predetermined or specified maximum transmission delay.

For electronic trading systems, the maximum acceptable delay for a message would typically be between 10 microseconds and 1 millisecond, and could be, for example, 50 microseconds, 100 microseconds, or 500 microseconds.

The delay determination unit described herein need not be a discrete hardware or software unit and could be a functionality provided by a software entity (such as a network stack) or a hardware entity (such as an interface controller).

A data processing system as described herein could include delay determination units configured to check the timestamp of network messages that are both to be transmitted and received from other data processing systems. The same or different delay determination units could be configured to check outgoing and incoming network messages.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system for selectively transmitting data onto a network, the data processing system comprising:
  an application running on a processor, the application configured to form data for transmission and cause a timestamp to be generated and associated with the data for transmission, said timestamp being dependent on one of:
    a time at which said data is formed by the application; and
    a time at which said application requests transmission;
  a network protocol stack running on a processor, the network protocol stack configured to form the data for transmission into one or more network messages for transmission over a network connection, the one or more network messages being associated with the timestamp; and
  a network interface device providing an interface between the network protocol stack and the network and comprising a delay determination unit, the delay determination unit configured to, immediately prior to the one or more network messages being transmitted onto the network by means of the network interface device, check the timestamp to determine the time elapsed from the time represented by the timestamp and, if the time elapsed is greater than a maximum period, cause the one or more network messages to be discarded.

2. A data processing system as claimed in claim 1, wherein the network protocol stack is configured to generate the timestamp in response to the application requesting transmission of the data for transmission.

3. A data processing system as claimed in claim 2, wherein the application is configured to request transmission of the data for transmission by means of one or more calls to a socket library.

4. A data processing system as claimed in claim 1, wherein the application is configured to generate the timestamp on forming the data for transmission and the network protocol stack is configured to receive the timestamp on accessing the data for transmission.

5. A data processing system as claimed in claim 1, wherein the timestamp indicates the time at which the timestamp is generated.

6. A data processing system as claimed in claim 1, wherein the network protocol stack is configured to include the timestamp in the one or more network messages, optionally in the metadata of the one or more network messages.

7. A data processing system as claimed in claim 1, wherein the delay determination unit is provided at an interface controller of the network interface device.

8. A data processing system as claimed in claim 1, wherein the network interface device includes a direct memory access (DMA) controller and the delay determination unit is configured to check the timestamp in response to the DMA controller retrieving the one or more network messages from a transmit queue of the data processing system.

9. A data processing system as claimed in claim 1, wherein, on discarding the one or more network messages, the network connection is reset or the transmission of any further network messages over the network connection is disabled.

10. A data processing system as claimed in claim 1, wherein the network protocol stack is configured to notify the application if the one or more network messages are discarded.

11. A data processing system as claimed in claim 1, wherein the network protocol stack is configured to, on generating a network message for retransmission of an original network message, include in the network message for retransmission the timestamp included in the original network message for transmission.

12. A data processing system as claimed in claim 1, further comprising a control interface by means of which the application can specify the maximum period to the delay determination unit for the network connection or in respect only of the data for transmission.

13. A data processing system as claimed in claim 12, wherein the control interface is further configured to, in response to a request from the application, cause the network protocol stack to indicate to the application those network messages that have been discarded by the delay determination unit.

14. A data processing system as claimed in claim 12, wherein the control interface is further configured to, in response to a request from the application, cause the network protocol stack to indicate to the application whether the network connection has been reset or disabled.

15. A data processing system as claimed in claim 12, wherein the delay determination unit is configured to, if the time elapsed does not exceed the maximum period, allow the one or more network messages to be transmitted onto the network by means of the network interface device, and the network protocol stack is configured to, on an acknowledgement message being received from a remote endpoint of the network connection indicating that the remote endpoint has received one or more of the network messages, generating an acknowledgment timestamp so as to record when the acknowledgement message is received at the data processing system.

16. A data processing system as claimed in claim 15, wherein the control interface is further configured to, in response to a request from the application, cause the network protocol stack to provide a representation of the acknowledgment timestamp to the application.

17. A data processing system as claimed in claim 1, wherein the application is further configured to provide the maximum period to the network protocol stack with the data for transmission.

18. A data processing system as claimed in claim 1, wherein the delay determination unit is configured to, on causing one or more network messages to be discarded, cause an event indicating which network messages have been discarded to be written to an event queue of the application.

19. A method for selectively transmitting data onto a network from a data processing system supporting at least one application and a network interface device, the at least one application being operable to transmit data over a network by means of the network interface device, the method comprising:
    forming data for transmission at an application;
    generating a timestamp and associating the timestamp with the data for transmission, said timestamp being dependent on one of:
        a time at which said data is formed by the application; and
        a time at which said application requests transmission;
    subsequently, forming the data for transmission into one or more network messages for transmission over the network, the one or more network messages being associated with the timestamp; and
    immediately prior to the one or more network messages being transmitted onto the network, checking the timestamp at the network interface device to determine the time elapsed from the time represented by the timestamp and, if the time elapsed is greater than a maximum period, causing the one or more network messages to be discarded, said network interface device providing an interface to the network.

20. A data processing system for selectively transmitting data onto a network, the data processing system comprising:
    an application configured to form data for transmission and cause a timestamp to be generated and associated with the data for transmission;
    a network protocol stack configured to form the data for transmission into one or more network messages for transmission over a network connection, the one or more network messages being associated with the timestamp;
    a network interface device comprising a delay determination unit, the delay determination unit configured to, immediately prior to the one or more network messages being transmitted onto the network by means of the network interface device, check the timestamp to determine the time elapsed from the time represented by the timestamp and, if the time elapsed is greater than a maximum period, cause the one or more network messages to be discarded; and
    a control interface by means of which the application can specify the maximum period to the delay determination unit for the network connection or in respect only of the data for transmission;
    wherein the delay determination unit is configured to, if the time elapsed does not exceed the maximum period, allow the one or more network messages to be transmitted onto the network by means of the network interface device, and the network protocol stack is configured to, on an acknowledgement message being received from a remote endpoint of the network connection indicating that the remote endpoint has received one or more of the network messages, generating an acknowledgment timestamp so as to record when the acknowledgement message is received at the data processing system; and
    the control interface is further configured to, in response to a request from the application, cause the network protocol stack to provide a representation of the acknowledgment timestamp to the application.

* * * * *